United States Patent [19]

Sagara et al.

[11] 4,052,632
[45] Oct. 4, 1977

[54] METHOD OF UNDERWATER WELDING

[75] Inventors: Hideo Sagara; Yasuhiro Nishio; Hirokazu Wada; Yoshinori Hiromoto, all of Hiroshima, Japan

[73] Assignee: Mitsubishi Jukogyo Kabushiki Kaisha, Japan

[21] Appl. No.: 496,830

[22] Filed: Aug. 12, 1974

Related U.S. Application Data

[62] Division of Ser. No. 384,897, Aug. 2, 1973.

[30] Foreign Application Priority Data

Sept. 4, 1972   Japan .................................. 47-87934

[51] Int. Cl.² .............................................. B23K 9/16
[52] U.S. Cl. .................................... 219/137 R; 219/74
[58] Field of Search ............... 219/121 P, 74, 75, 130, 219/137 R, 72; 313/231

[56] References Cited
U.S. PATENT DOCUMENTS

| | | | |
|---|---|---|---|
| 2,806,124 | 9/1957 | Gage | 219/74 X |
| 2,903,559 | 9/1959 | Wempe | 219/75 |
| 2,906,858 | 9/1959 | Morton, Jr. | 219/121 P |
| 3,131,288 | 4/1964 | Browning | 219/121 P |
| 3,204,075 | 8/1965 | Browning | 219/121 P X |
| 3,473,002 | 10/1969 | Suzuki | 219/74 X |
| 3,575,568 | 4/1971 | Tateno | 219/75 |
| 3,597,576 | 8/1971 | Bernard et al. | 219/130 |
| 3,632,950 | 1/1972 | Berghof | 219/72 |
| 3,833,787 | 9/1974 | Couch, Jr. | 219/121 P |

*Primary Examiner*—J. V. Truhe
*Assistant Examiner*—Clifford C. Shaw
*Attorney, Agent, or Firm*—Cushman, Darby & Cushman

[57] ABSTRACT

The invention relates to a welding torch for welding underwater and to a method of underwater welding using the welding torch. A high speed stream of water is directed from a nozzle on the welding torch obliquely onto a member or members to be welded to form a flared-out curtain of water. Gas is injected into the volume enclosed by the curtain of water to create a gaseous atmosphere and welding is carried out in the gaseous atmosphere.

3 Claims, 12 Drawing Figures

Fig. 5b.
Fig. 5c.
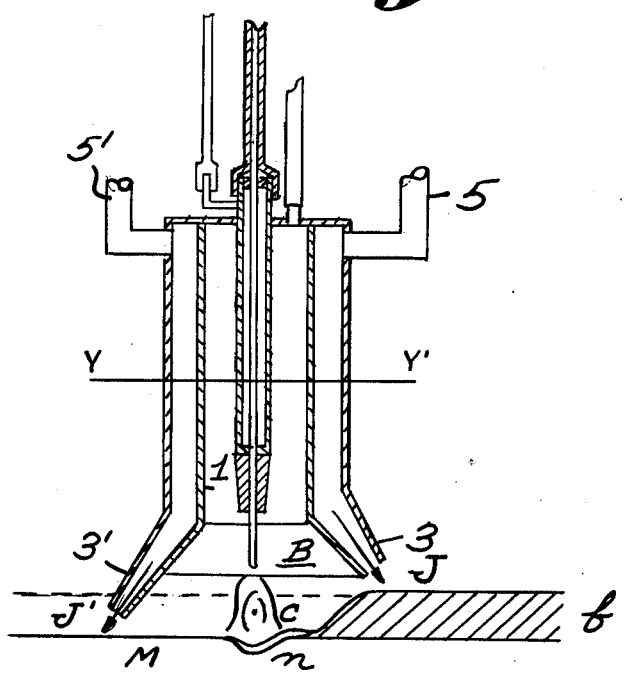
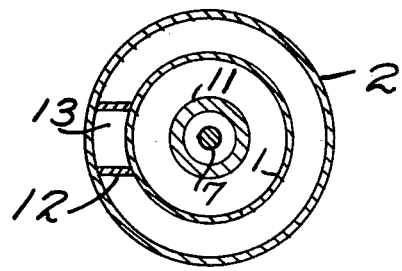
Fig. 5d.
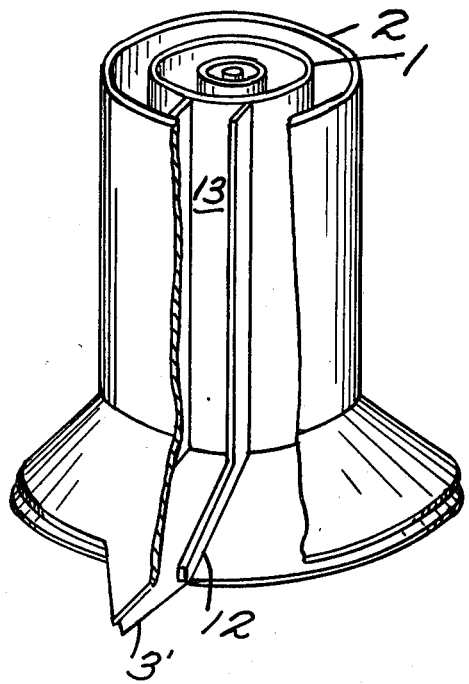

METHOD OF UNDERWATER WELDING

This is a division of application Ser. No. 384,897 filed Aug. 2, 1973.

FIELD OF THE INVENTION

The present invention relates to a welding torch for underwater welding and to a method of underwater welding.

BACKGROUND OF THE INVENTION

Methods of underwater welding known in Japan include a dry method in which a chamber from which water has been removed is provided in the water and welding is carried out in this chamber, and a wet method in which welding is carried out directly in the water. As the wet method, heretofore, there has been proposed in Japan a method in which a gas is injected from the outer periphery of the tip end of a welding rod which arc welding is carried out within the atmosphere of the injected gas (See Japanese Patent Publication No. 45-32139), and a method in which shielding is effected with viscous liquid and plasma welding is carried out within the shielding.

As a consequence of recent progress in ocean cultivation, field welding works for large-scale marine structures are needed, and so a need has arisen for an underwater welding technique. Except for the dry method, underwater welding has seldom been employed in practice. However, the wet method is preferable for economic reasons and especially for welding a complex joint structure, and thus its practical development has been desired. While some research on the wet method has been carried out on a laboratory scale in Japan, degradation of the welding characteristics cannot be obviated because the above mentioned method involves welding within a water atmosphere, and so the wet method has not yet reached the stage of practical success.

SUMMARY OF THE INVENTION

According to one aspect of the present invention there is provided a welding torch for underwater welding which includes a nozzle extending around the tip of the welding torch, from which nozzle a high speed stream of water can be directed obliquely onto a member or members being welded to form a flared-out curtain of water, and means to inject gas into the volume enclosed by the curtain of water to create a gaseous atmosphere in which welding can be carried out.

According to a further aspect of the invention there is provided a method of welding underwater using a welding torch in accordance with the first aspect of the invention, in which a high speed stream of water is directed from a nozzle obliquely onto a member or members being welded to form a flared-out curtain of water, gas is injected into the volume enclosed by the flared-out curtain of water to create a gaseous atmosphere and welding is carried out in the gaseous atmosphere. Thus in operation a water curtain surrounding the tip end portion of the welding torch is formed by injecting a high speed jet flow from the injection nozzle obliquely downward over the entire circumference so that the jet flow collides with the surface of the members to be welded, whereby invasion of water into the tip end portion of said welding torch is prevented by viscous fluid resistance of the water curtain. The water in the region beneath the tip end portion of the welding torch is discharged to be replaced by shielding gas injected from the welding torch, so that there is formed a local cavity filled with the shielding gas. An arc can be ignited within the cavity for carrying out the welding operation.

The disclosed method for underwater gas-shield arc welding includes the steps of:

establishing an electric potential between a welding electrode disposed within welding apparatus and an article to be welded so as to form an arc therebetween;

providing an annular current of shielding gas about said welding arc for protecting and shielding said arc; and projecting a curtain of water, concentrically disposed about said annular current of shielding gas, from said apparatus toward said article to be welded at a velocity which is sufficiently high so as to prevent the invasion by the ambient water within the underwater environment into the welding environment comprising said shielding gas and said welding arc and thereby protect said gas and said arc from said ambient water within said underwater environment, whereby said arc and said welding may be stably maintained.

BRIEF DESCRIPTION OF THE DRAWING

The invention will be illustrated in more detail hereinafter with reference to the accompanying drawings showing, by way of example, embodiments of the invention.

FIG. 1b is a transverse cross-sectional view taken substantially along line Y—Y' of FIG. 1a;

FIG. 3b is a transverse cross-sectional view taken substantially along line Y—Y' of FIG. 3a;

FIG. 4b is a transverse cross-sectional view taken substantially along line Y—Y' of FIG. 4a;

FIG. 5b is a longitudinal cross-sectional view of the form of the torch shown in FIG. 5a;

FIG. 5c is a transverse cross-sectional view taken substantially along line Y—Y' of FIG. 5b; and FIG. 5d is a fragmentary perspective view of the lower portion of the form of the torch shown in FIGS. 5a-5c, partly broken away and sectioned to expose interior details.

DETAILED DESCRIPTION OF PRESENTLY PREFERRED EMBODIMENTS

Figure 1A:
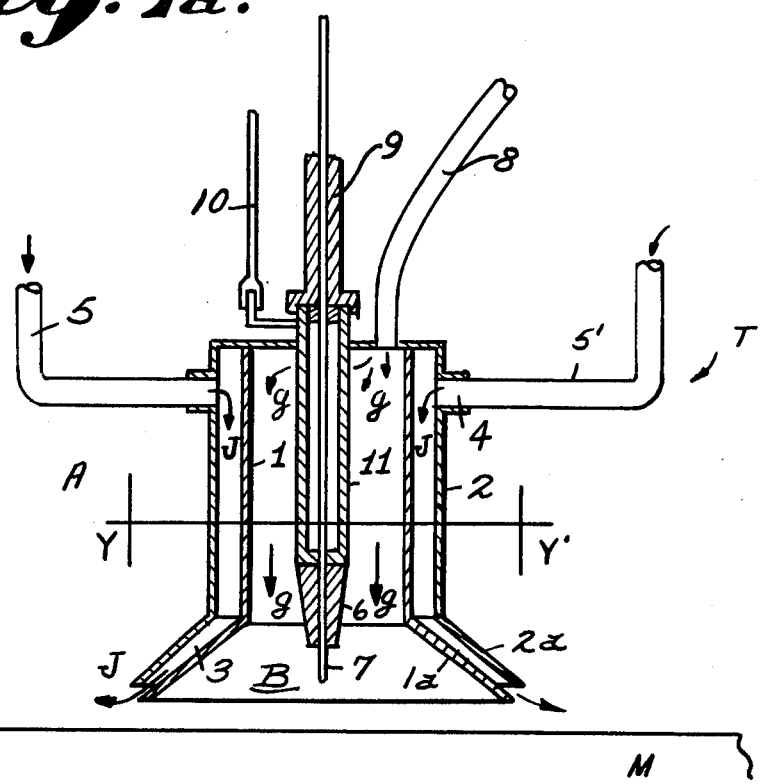
FIG. 1a is a longitudinal cross-sectional view of one embodiment of the welding torch in an underwater environment.
Figure 1B:
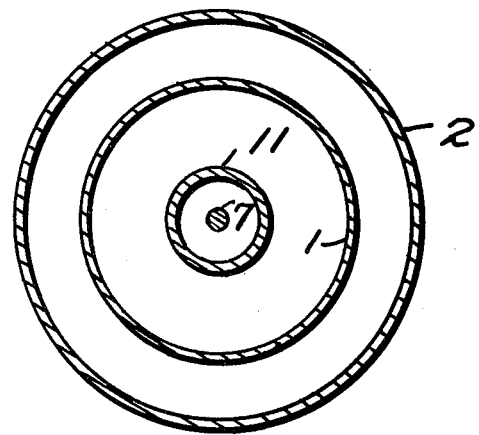

Referring to FIGS. 1a-1c, a welding torch T is provided with a cylindrical member 1 at its centre to form a gas passageway for injecting shielding gas. The tip end portion 1a of the cylindrical member is formed in a flared shape. Around the entire circumference of the cylindrical member 1 there is provided a jet flow cylinder 2 for forming a water curtain surrounding the entire outer periphery of the cylindrical member 1. The jet flow cylinder 2 has a flared tip end portion 2a. The concentric tip end portion 2a of the cylinder 2 and tip end portion 1a of the cylinder 1 form an injection nozzle 3 which is directed obliquely downward and outward.

Shielding gas is supplied through hose means 8. Cables for supplying wire 7 and electricity are respectively shown at 9 and 10. The electrical supply cable 10 connects with an electrical supply cylinder 11 which extends within the torch.

Although it is not shown, it will be appreciated that the welding torch T is adapted for a welding wire to be introduced into the interior of the cylindrical member 1 by the intermediary of wire clips.

Upon carrying out underwater welding by means of the illustrated welding torch T, a high speed jet flow of fluid fed from a pump (not shown) is passed through the jet flow cylinder 2 so that the liquid is ejected as a high speed jet flow $j$ from the tip end nozzle 3 obliquely downwards and outwards. The jet flow $j$ then collides with the surface of the member M to be welded and is discharged outwardly over the entire circumference along the surface of the member M. Consequently, the water in the exterior A and the water in the region B beneath the tip end portion of the welding torch become shielded from each other by means of the water curtain formed by the jet flow, and the water in the region B is driven and extracted toward the outer circumference owing to the viscous resistance and centrifugal force of the jet flow and the aspirator effect between the member to be welded and the jet nozzle. Simultaneously, shielding gas $g$ is passed through the cylindrical member 1 at the centre of the welding torch, and the water in the region B is replaced by the shielding gas $g$ with the results that the region B becomes a gaseous atmosphere. The flow of shielding gas $g$ continues so that excess gas flows out through the gap between the opening of the nozzle 3 and the surface of the member M towards the outer circumference, taking a form of "gas plus water" mixture as driven by the jet flow $j$, the driven gas being discharged in the form of small bubbles. Thus a stable cavity is formed in the region B and the welding operation is carried out by igniting an arc within the thus formed cavity. Thus welding can be carried out within a stabilized gaseous atmosphere, so that welding operations as stable as welding operation on the ground can be carried out and stable welded joints of good quality can be obtained.

Figure 2:
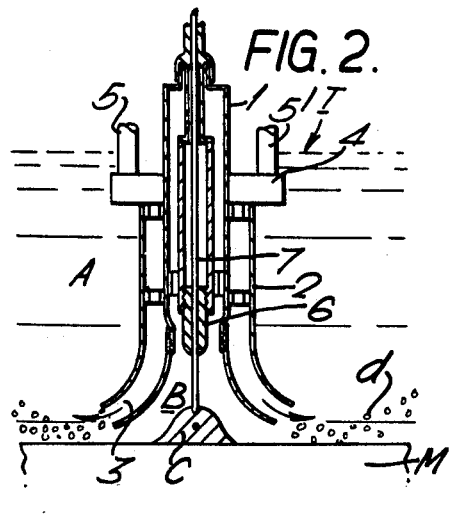
FIG. 2 is a longitudinal cross-sectional view showing a torch embodiment similar to that of FIGS. 1a and 1b, in use underwater.
Figure 5A:
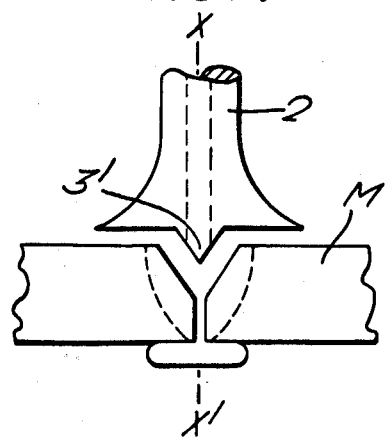
FIG. 5a is a fragmentary front elevation view of a modified form of the torch.

FIG. 2 is a schematic longitudinal cross-sectional view of a welding torch which was produced by a way of trial after fundamental research on the shape, dimension and the like of a welding torch for forming a stable cavity to embody the present invention. (The component parts in FIG. 2 corresponding to the respective parts in FIGS. 1a–1c are given the same references.). In FIG. 2, reference numeral 1 designates a cylindrical member, numeral 2 designates a jet flow cylinder, numeral 3 designates a nozzle, numeral 4 deisgnates a header for the jet flow cylinder, and numerals 5 and 5' designate jet flow feeding ports affixed to the header 4. The jet flow feeding ports 5, 5' are connected to a delivery port of a pump not shown. Numeral 6 designates a wire tip, numeral 7 designates a welding rod or wire, reference B designates a cavity region formed beneath the tip end portion of the cylindrical member 1 owing to the shielding gas fed through the cylindrical member 1, reference C designates an arc ignited within the region B, and reference $d$ designates the shielding gas in the form of small bubbles discharged from the region B into the water in the exterior region A as extracted by a high speed jet flow ejected from the nozzle 3 of the jet flow cylinder 2.

After experiments on underwater welding by making use of the welding torch constructed as described above, we confirmed that the cavity formed in the region B is largely affected by the flow rate of the shielding gas, the velocity and direction of the high speed jet flow, the distance between the welding torch and the member M to be welded, etc., that a stable cavity of about 50mm in diameter could be obtained experimentally, and that upon carrying out the welding operation by igniting an arc within the cavity it was possible to achieve quite stabilized welding which involved no disadvantage over the prior art welding on the ground as expected from the basic principle.

Figure 3A:
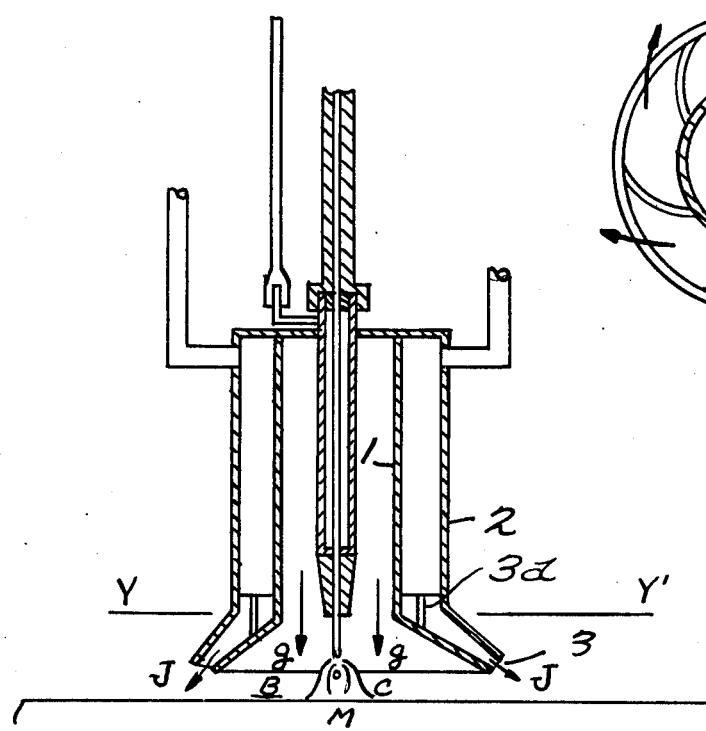
FIG. 3a is a longitudinal cross-sectional view of another embodiment of the torch, provided with guide vanes.
Figure 3B:
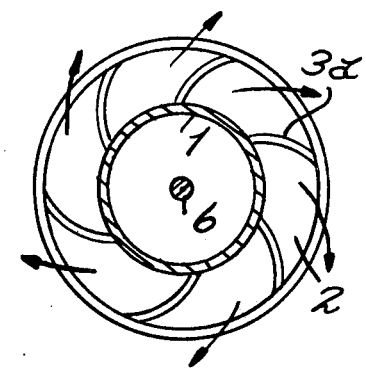
Figure 3C:
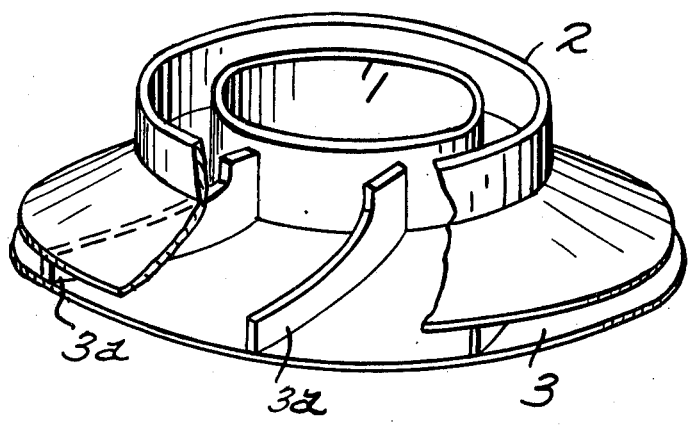
FIG. 3c is a fragmentary perspective view of the lower portion of the torch, partly broken away and sectioned to better show the vanes.

The nozzle portion 3 of the jet flow cylinder 2 can be provided with guide vanes 3a at equal intervals around the circumference as shown in FIGS. 3a–3c to convert the direction of injection of the jet flow injected from the nozzle 3 by means of the guide vanes 3a so that a tangential force is applied to the jet flow. By this means the formation of the water curtain from the jet flow is further stabilized, and thereby an advantage is obtained in that a more stabilized cavity is formed within the inside of the water curtain by the shielding gas fed through the cylindrical member 1.

Figure 4A:
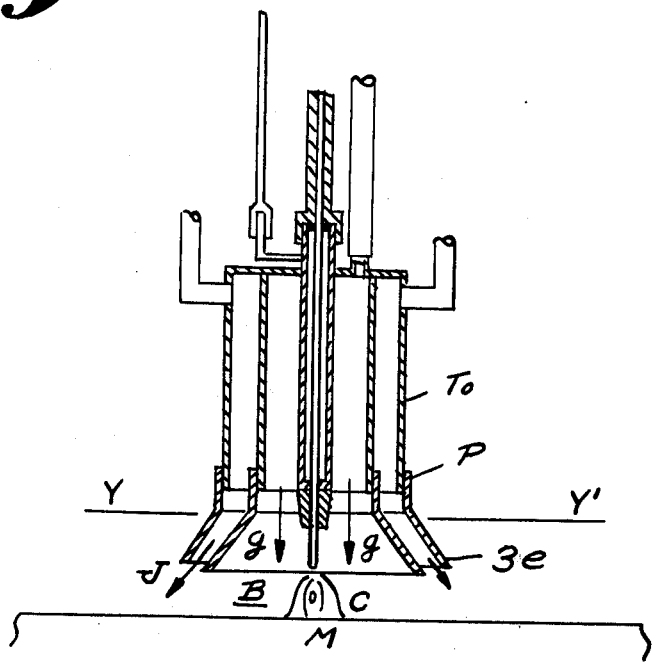
FIG. 4a is a longitudinal cross-sectional view of another embodiment of the torch, wherein the cavity between the cylindrical members is of eliptical transverse cross-sectional figure.
Figure 4B:
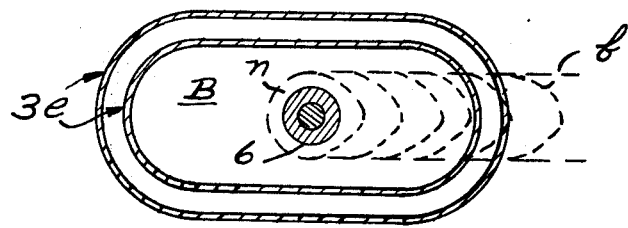

FIGS. 4a–4b illustrate a modified embodiment in which the the jet flow cylinder being omitted). If the welding torch is formed in this way, then the cavity region B will be elliptical, as illustrated, and therefore, upon practical welding even though a molten pool $m$ is drawn backwardly as the welding condition is varied, the molten pool $m$ as well as bead metal $b$ immediately after solidification will be positioned well within the cavity region B if the lengthwise direction of the elliptic cavity region B is chosen in parallel to the direction of welding, so that an advantage is obtained in that stabilized welding of good quality can be achieved.

The above-described welding torch is preferred for use in joint welding in the case of I-shaped edge preparation. However in the case of V-shaped or U-shaped edge preparation it is difficult to form a water curtain which extends to the inner bottom of the bevelled edge by means of the aforementioned welding torch. However, by extending downwardly only the nozzle edge portion 3' in the forward direction of welding along the bevelled edge line until it reaches the inner bottom of the bevelled edge, and also by intensifying the jet flow at the said portion independently upon the remaining circumferential portions using partitions 12 to provide a separate flow patch 13 as shown in FIGS. 5a–5d, the water curtain can be formed so as to extend to the inner bottom of the bevelled edge, and thereby a stabilized cavity can be formed within said water curtain.

Besides, in accordance with the configurations of the welding joints, the shape of the tip end portion of the welding torch can be determined appropriately so that a stabilized cavity may be formed within the water curtain.

We claim:

1. A method of welding underwater, comprising:

feeding welding rod means to a region where a member is to be welded and heating the welding rod means to effect welding of said member in said region;

confining a first space extending down to close to said region;

confining a second space extending annularly of the first confined space, said confining causing the first space to flare close to said region to define a cavity within which said welding is effected and causing the annular second space to define a flaring annular nozzle of decreasing width of cross-sectional area surrounding said cavity;

conducting a pressurized stream of weld-shielding gas down through the first space and into said cavity for expelling water therefrom, for preventing the invasion of water into said cavity and for shielding said welding; and conducting a stream of water down through the second space and out said flaring annular nozzle with sufficient force to prevent the invasion of water into said cavity during underwater welding and to assist in aspirating excess of said gas from said cavity in the form of small bubbles during underwater welding.

2. The method of claim 1 further including impressing a spirling pattern upon the water being conducted through said second space to cause that water to be centrifugally injected from the flaring annular nozzle.

3. In underwater gas-shield arc welding, a method comprising:

establishing an electric potential between a welding electrode disposed within welding apparatus and an article to be welded so as to form an arc therebetween;

providing an annular current of shielding gas about said welding arc for protecting and shielding said arc; and projecting a curtain of water, concentrically disposed about said annular current of shielding gas, from said apparatus toward said article to be welded at a velocity which is sufficiently high so as to prevent the invasion by the ambient water within the underwater environment into the welding environment comprising said shielding gas and said welding arc and thereby protect said gas and said arc from said ambient water within said underwater environment whereby said arc and said welding may be stably maintained.

* * * * *